Dec. 7, 1965  R. F. DEHN  3,222,464
TROLLEY CONDUCTOR
Filed Oct. 4, 1963  2 Sheets-Sheet 1
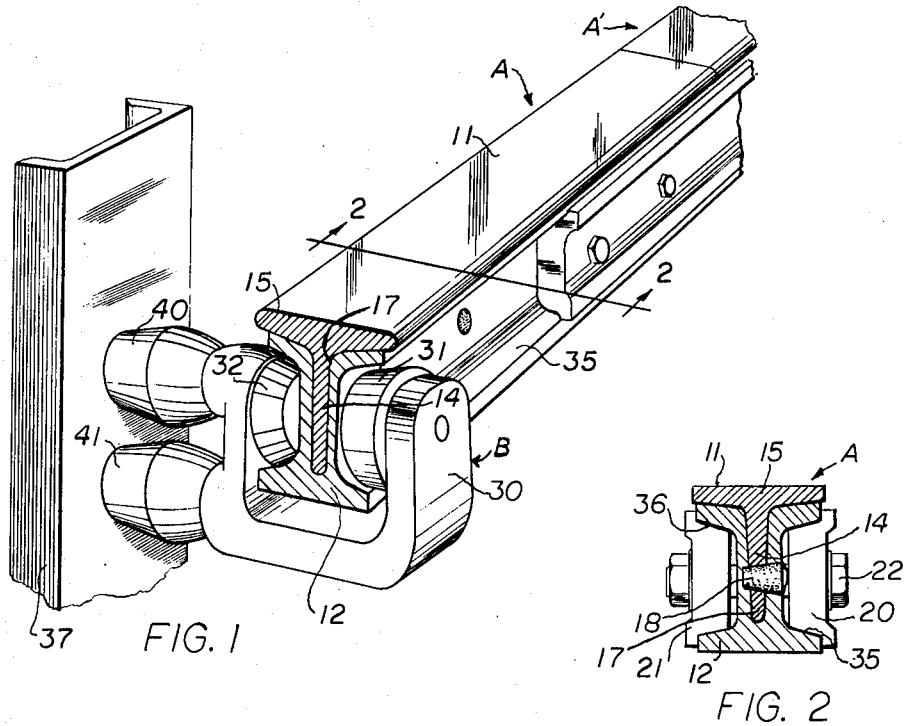
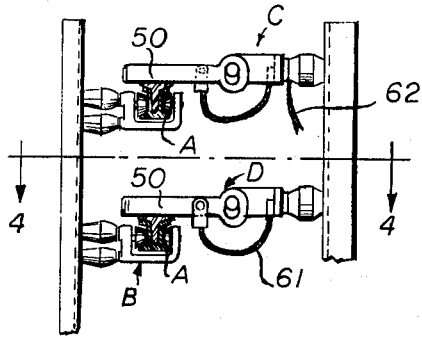
FIG. 3
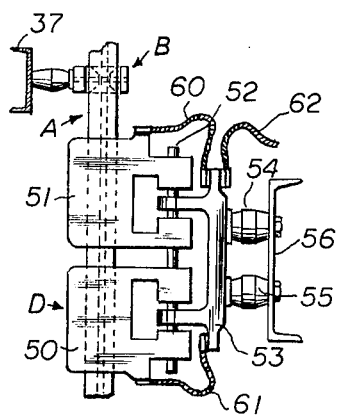
FIG. 4
INVENTOR.
ROY F. DEHN
BY Williams, David,
Hoffmann & Yount
ATTORNEYS Dec. 7, 1965    R. F. DEHN    3,222,464
TROLLEY CONDUCTOR
Filed Oct. 4, 1963    2 Sheets-Sheet 2

INVENTOR.
ROY F. DEHN
BY Williams, David,
Hoffmann + Yount
ATTORNEYS

United States Patent Office 3,222,464
Patented Dec. 7, 1965

3,222,464
TROLLEY CONDUCTOR
Roy F. Dehn, Wickliffe, Ohio, assignor to The Cleveland Crane & Engineering Company, Wickliffe, Ohio, a corporation of Ohio
Filed Oct. 4, 1963, Ser. No. 313,959
1 Claim. (Cl. 191—22)

This invention relates to electrified rail or runway-type systems for handling material or personnel and more particularly to trolley conductors employed in such systems.

Many electrified rail or runway-type systems used for handling material and/or personnel requires the transfer of large amounts of electrical current to the carriers or cars on the system either to operate apparatus on the movable carriers or cars, such as, a hoist on the trolley of an overhead bridge-type crane or on a carrier of an overhead monorail system, and/or to propel the carriers or cars along their tracks, for example, an overhead bridge-type crane along its runway.

In systems of the type referred to, the trolleys or current collectors usually slide along the trolley conductor bars, as it has been found that this provides a very good current transfer from the trolley conductor to the trolley or current collector. The design and construction of suitable conductor bars for such systems, however, presents many problems because the better wearing conductor bar materials, such as iron, usually are relatively poor conductors of electric current and the more suitable current carrying materials, such as copper and aluminum, have relatively poor wearing characteristics. When conductor bars are made of materials having high electric resistance, and therefore have poor current carrying characteristics, they must, of necessity, be relatively large and heavy and/or require the use of current feeding cables connected thereto at closely spaced intervals. The use of large heavy conductor bars is also disadvantageous from the standpoint of their installation and physical support at spaced intervals without sagging, etc. Sagging, for example, prevents proper contact between the conductor bar and the current collector or trolley which travel therealong. Conductor bars made of material having relatively high electric conductivity are usually relatively weak structurally, require support at close intervals and have poor wearing qualities.

Having in mind the foregoing, one of the principal objects of the invention is the provision of a novel trolley conductor bar comprising both of the aforesaid types of materials thereby incorporating in the conductor bar the desired quality of both types of materials, that is, high strength and good wearing characteristics, and high electrical conductivity.

A further object of the invention is the provision of a novel trolley conductor bar of the character mentioned having different portions thereof formed of different material joined together in such a manner that good electrical transfer takes place between the different portions, and preferably in such a manner that the difference in expansion of the portions made of the different materials, with changes in temperature, are counteracted.

A still further object of the invention is the provision of a novel conductor bar of the character referred to and having different portions made of different types of material in which the portion made of high strength and good wearing characteristics serve as the part of the conductor bar engaged by the trolley or current collector and in which another portion made of material having high electrical conductivity serves as the primary current carrying part of the bar.

A further object of the invention is the provision of a novel conductor bar of the character referred to which can be supported by conventional hangers in either an upright or an inverted position, i.e. for engagement by a gravity biased trolley or current collector which contacts the top of the conductor bar or by a spring biased trolley or current collector which engages the bottom of the conductor bar.

The invention resides in certain constructions, and combinations and arrangements of parts and further objects and advantages of the invention will be apparent to those skilled in the art to which it relates from the following description of the preferred embodiment described with reference to the accompanying drawings forming a part of this specification, in which similar reference characters designate corresponding parts, and in which:

FIG. 1 is a perspective view of a portion of a trolley conductor bar run embodying the invention supported by roller-type hangers for engagement by a current collector slidable upon the upper surface of the conductor bar;

FIG. 2 is a cross-sectional view taken approximately on the line 2—2 of FIG. 1;

FIG. 3 is a cross-sectional view of a plurality of tiered conductor bars embodying the present invention connected to a suitable support, for example, the wall of a building and engaged by top running current collectors or trolleys carried by a movable apparatus, for example, the bridge of an overhead crane;

FIG. 4 is a view approximately on the line 4—4 of FIG. 3;

Figure 5:
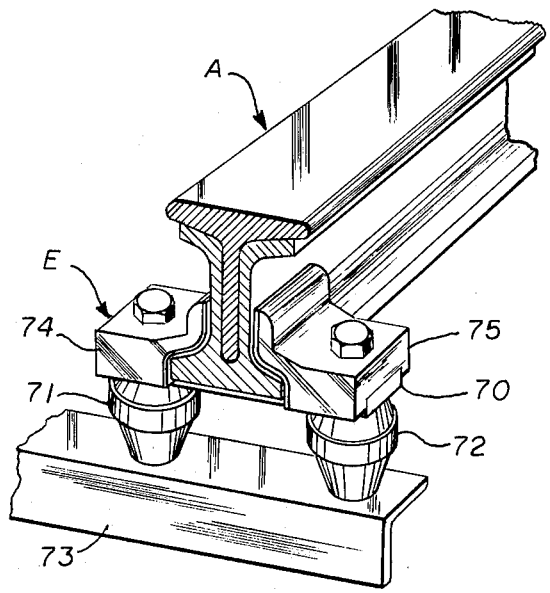
FIG. 5 is a view similar to FIG. 1, but showing the trolley conductor bar supported by a slide-type hanger.

Generally speaking the illustrated embodiment of the invention is a composite conductor bar formed of an elongated member of high strength and good wearing characteristics, for example, steel, having a cross-sectional shape generally similar to that of a T with its web or stem positioned in a slot in the upper edge of an elongated member having high electrical conductivity characteristics, for example, aluminum, having a cross-sectional shape generally similar to that of an I, with the underside of the flange of the T-shaped member engaging the top of the I-shaped member. The members are welded together at intervals in such a manner that the differences in expansion of the members during use are compensated for or counteracted. The member made of the relatively hard, high strength material having good wearing properties serves as the part of the trolley conductor bar engaged by the trolley or current collector and the other member made of the relatively soft material having high electrical conductivity serves as the primary current carrying part of the bar. A conductor bar of the construction shown incorporating and combining optimum strength and wearing characteristics with optimum current carrying capacity, is of minimum size, requires support only at widely spaced intervals and requires minimum current feeding connections.

The reference to T-shaped and I-shaped members is intended merely to describe the general shape of the members, as the shape of the members referred to may be varied within the scope of the invention.

Referring specifically to the drawings and the illustrated embodiment of the invention shown therein, the trolley conductor bar, designated generally by the reference character A, includes an elongated generally T-shaped member 11 made of steel and an elongated generally I-shaped member 12 made of aluminum suitably secured together. The T-shaped member 11 may be a commercially available standard structural member, and includes a stem or web 14 and a top flange 15, the opposite sides of which flange project substantially perpendicular to the center line of the web and equal distances therefrom.

The I-shaped member 12 shown is an aluminum extrusion and has a longitudinal aperture or slot 17 in its upper or top side into which the stem or web 14 of the T-shaped member 11 is inserted until the undersides of the flange 15 of the T-shaped member engages the upper side of the top of the I-shaped member 12. The two members 11 and 12 are preferably secured together as by plug welding, that is, drilling the members from one side, as illustrated in FIG. 2, and welding a plug of material 18 therein. The members 11 and 12 of the conductor bar A, illustrated, are made to close tolerances and when the composite bar is formed in the manner described the adjoining surfaces of the members 11 and 12 conform closely to one another thereby providing minimum resistance to the transfer of electric current from one to the other.

One or more conductor bars may be employed in any given conductor bar run depending upon the requirements of the installation in which the conductor bar is used. The conductor bars may be joined end to end in any convenient manner, for example, as shown in FIGS. 1 and 2, by suitable splice plates 20, 21 positioned at opposite sides of and overlapping the adjoining ends of adjacent conductor bars and secured together by bolts 22. The second conductor bar, shown in FIG. 1, is designated as A', and is a duplicate of the conductor bar A, already described.

The conductor bar of the present invention may be supported in any conventional manner. A suitable roller-type hanger B is shown in FIG. 1. As is well understood in the art, any desired number of hangers may be employed depending upon the length of the conductor bar run. The hangers B each comprise a U-shaped frame member 30 having rollers 31, 32 rotatably connected to the adjoining sides of the upper ends of the tine parts of the U-shaped member 30. The rollers 31, 32 engage within the channels 35, 36 on the opposite sides of the conductor bar provided by the I-shape of the bar. The frame or bracket member 30 is supported to a suitable stationary support 37 by insulators 40, 41 in a more or less conventional manner. The stationary support shown is a section of steel channel forming a part of the structure which carries the conductor bar and which is stationary relative to the movable apparatus which carries the current collectors or trolleys. For example, the member 37 may be a part of the building structure within which a movable crane is supported. The fact that the conductor bar runs are supported on rollers permit free movement thereof in the event of contraction and expansion incident to changes in temperature. Each run is preferably anchored at merely one point, preferably the center point or some point closely adjacent to the center of the run.

Two tiered conductor bars A are shown in FIG. 3, which figure also shows trolley collectors C and D in contact with and movable along the top sides of the upper and lower conductor bars, respectively. The current collectors are duplicates of one another and each comprise a pair of contact members 50, 51 pivotally connected by a pintle pin or rod 52 to a bracket 53, which bracket is in turn connected by a pair of insulators 54, 55 to a frame member 56, in the present instance, a steel channel, which, for example, may be a part of a building, the bridge of an overhead crane, etc. The electrical connections to the contact members 50, 51 are made by suitable flexible electrical conductors 60, 61 and 62 in a conventional manner.

While each trolley or current collector illustrated comprises two contact members it is to be understood that one or more contact members may be employed depending upon the amount of current which is to be transmitted from the conductor bar to the current collector or trolley, etc. The contact members of the current collectors are preferably made of a cast material, such as cast iron, which has good wearing qualities, particularly when used in cooperation with a steel conductor bar surface.

Figure 6:
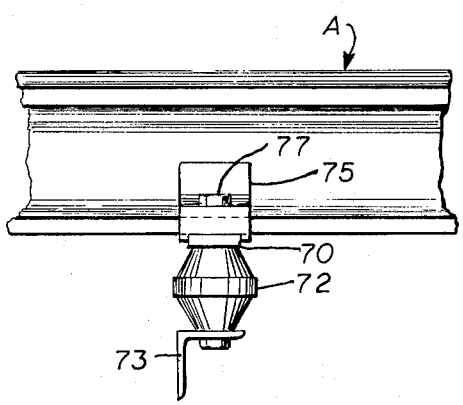
FIG. 6 is a fragmentary side elevational view of the trolley conductor bar and hanger shown in FIG. 5.
Figure 7:
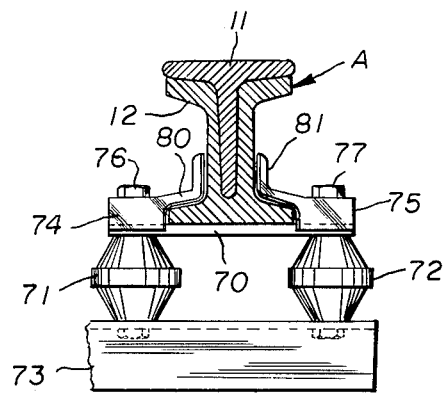
FIG. 7 is a front elevational view of the trolley conductor bar and hanger as shown in FIG. 5.

An alternative type of hanger for supporting the trolley conductor bar A is shown in FIGS. 5 to 7. This hanger is designated generally by the reference character E. As shown in these figures, the trolley conductor bar is positioned upon a plate-like member 70 supported on a pair of insulators 71, 72 similar to the insulators 54 previously referred to. The insulators are carried by a suitable bracket, in the present instance an angle iron 73 connected to a suitable support which, as previously explained, may be the frame of a building, the bridge of a crane, etc.

The trolley conductor bar is held assembled with the plate-like member 70 upon which it is positioned by members 74, 75 located at opposite sides thereof and fixed to the plate-like member 70 by screws 76, 77, respectively, which also connect the member 70 to the insulators 71, 72.

The members 74, 75 have grooves in their lower sides into which upper parts of the member 70 projects to better secure the members 74, 75 against rotation about the screws 76, 77 relative to the member 70 and inwardly projecting portions 80, 81 which overlie the lower adjacent flange portions of the conductor bar and extend up along the web thereof a short distance. The members 74, 75 closely engage the lower flange portions of the conductor bar and the lower portion of the web thereof but permit the conductor bar to slide relative to the hanger E.

While the conductor bar A is shown in the drawings with the T-shaped steel member above or on top of the I-shaped aluminum member and with the trolleys or current collectors or the contact members of the trolleys engaging the upper surface thereof and held in contact therewith by gravity, it is to be understood that the conductor bar may be otherwise positioned and different types of current collectors or trolleys used therewith, for example, the conductor bar may be rotated 90° or 180° and the contact surface thereof, that is, the outer surface of the flange of the T-shaped member engaged by any suitable type of current collector having a contact member spring-biased in contact with the conductor bar. As an illustration, the present drawings may be turned upside down, in which event the contact surface of the conductor bar will be facing downwardly. In this event the contact member of the current collector can be spring-biased into contact with the flange of the T-shaped member of the conductor bar.

From the foregoing description of the preferred embodiment of the invention, it will be apparent that the objects heretofore enumerated and others have been accomplished and that there has been provided a novel conductor bar having different portions formed of different materials so as to take advantage of the good wearing characteristics and high-strength qualities of one material and the high electrical conductivity of another material. While in the preferred embodiment of the invention shown, a T-shaped steel member has been combined with an I-shaped aluminum extrusion to form the preferred embodiment of the invention, it is to be understood that the different parts of the conductor bar can be made of materials other than those mentioned and in forms different than those shown. The harder material which has the greater strength and wearing qualities preferably include a vertical web or part as such a part provides greater resistance to sagging or bending per unit of weight.

Having thus described my invention, what I claim is:

A trolley conductor bar comprising an elongated nonferrous metal member of high electrical conductivity having a central web and flanges along the opposite elongated edges thereof having flange portions which extend laterally from opposite sides of said web and form outwardly facing channels open along opposite sides of said member for receiving support members therein to engage the side walls of said channels to support said elongated member, one elongated edge of said web having an aperture therein coextensive with the length thereof and of a depth such that it terminates at approximately the junction of the plane of the adjacent laterally extending flange portions extending from the other elongated edge of said web, an elongated T-shaped ferrous metal member having a web closely received in said aperture and a transversely extending flange along one elongated edge thereof overlying and closely engaging the nonferrous flange portions extending from opposite sides of the opening to said aperture and forming a collector shoe slide surface.

References Cited by the Examiner

UNITED STATES PATENTS

| 283,760 | 8/1883 | Daft. |
| 3,090,840 | 5/1963 | Dehn. |

FOREIGN PATENTS

| 11,251 | 1898 | Great Britain. |
| 13,719 | 1904 | Great Britain. |
| 15,115 | 1900 | Great Britain. |
| 71,725 | 11/1915 | Austria. |

EUGENE G. BOTZ, *Primary Examiner.*

JAMES S. SHANK, LEO QUACKENBUSH, *Examiners.*